(12) United States Patent
Teranishi et al.

(10) Patent No.: US 10,829,404 B2
(45) Date of Patent: Nov. 10, 2020

(54) METHOD FOR CUTTING PLATE-LIKE GLASS, AND CUTTING DEVICE THEREFOR

(71) Applicant: Nippon Electric Glass Co., Ltd., Shiga (JP)

(72) Inventors: Yasuo Teranishi, Shiga (JP); Yasuhiro Matsumoto, Shiga (JP); Taiki Minari, Shiga (JP); Takaya Furuta, Shiga (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 729 days.

(21) Appl. No.: 14/988,146

(22) Filed: Jan. 5, 2016

(65) Prior Publication Data
US 2016/0122228 A1 May 5, 2016

Related U.S. Application Data

(62) Division of application No. 14/114,301, filed as application No. PCT/JP2011/063162 on Jun. 8, 2011, now abandoned.

(51) Int. Cl.
*C03B 33/09* (2006.01)
*C03B 33/02* (2006.01)
(Continued)

(52) U.S. Cl.
CPC .......... *C03B 33/091* (2013.01); *B32B 17/064* (2013.01); *C03B 33/023* (2013.01);
(Continued)

(58) Field of Classification Search
CPC ..... C03B 33/09; C03B 33/091; C03B 33/093; C03B 33/10; C03B 33/102; C03B 33/105; C03B 33/107; C03B 33/14
See application file for complete search history.

(56) References Cited

U.S. PATENT DOCUMENTS 4,232,809 A * 11/1980 Boehm .................. C03B 33/09
                                                                225/93
5,622,540 A *  4/1997 Stevens ............. B23K 26/0736
                                                                65/112
(Continued)

FOREIGN PATENT DOCUMENTS

CN       101486202       7/2009
JP       2004-505881     2/2004
(Continued)

OTHER PUBLICATIONS

International Search Report dated Sep. 13, 2011 in International (PCT) Application No. PCT/JP2011/063162.
(Continued)

*Primary Examiner* — Andrea L Wellington
*Assistant Examiner* — Richard D Crosby, Jr.
(74) *Attorney, Agent, or Firm* — Wenderoth, Lind & Ponack, L.L.P.

(57) ABSTRACT

A full body of a glass sheet (G) is cut by forming an initial crack (6a) on a preset cutting line (5) of the glass sheet (G) that is supported by a support member (2 (8)) from a back surface side of the glass sheet (G), followed by propagating the initial crack (6a) while passing through the glass sheet from a front surface to the back surface thereof due to a stress generated through localized heating along the preset cutting line (5) and cooling of a heated region that is formed through the localized heating, the glass sheet (G) being supported by the support member (2 (8)) from the back surface side through an intermediation of an elastic sheet (E) having low thermal conductivity.

11 Claims, 7 Drawing Sheets

(51) Int. Cl.
    *C03B 33/023* (2006.01)
    *B32B 17/06* (2006.01)
(52) U.S. Cl.
    CPC ...... *C03B 33/0215* (2013.01); *C03B 33/0235* (2013.01); *B32B 2307/304* (2013.01); *B32B 2457/20* (2013.01); *B65G 2249/04* (2013.01); *B65H 2801/61* (2013.01); *Y02P 40/57* (2015.11); *Y10T 225/12* (2015.04); *Y10T 225/304* (2015.04)

(56) References Cited

U.S. PATENT DOCUMENTS

| | | | | |
|---|---|---|---|---|
| 5,776,220 | A * | 7/1998 | Allaire | B23K 26/0736 65/112 |
| 6,489,588 | B1 * | 12/2002 | Hoekstra | B23K 26/0736 219/121.67 |
| 6,592,703 | B1 * | 7/2003 | Habeck | C03B 33/078 156/257 |
| 6,815,070 | B1 * | 11/2004 | Burkle | C03C 17/30 428/425.6 |
| 7,880,118 | B2 * | 2/2011 | Cheng | B28D 1/221 219/121.72 |
| 8,168,514 | B2 * | 5/2012 | Garner | B23K 26/38 438/463 |
| 8,269,138 | B2 * | 9/2012 | Garner | C03B 33/0215 219/121.69 |
| 8,312,741 | B2 * | 11/2012 | Teranishi | B28D 5/0011 65/97 |
| 8,685,838 | B2 * | 4/2014 | Fukuyo | B23K 26/0604 438/463 |
| 9,212,081 | B2 * | 12/2015 | Peng | C03B 33/076 |
| 9,333,724 | B2 * | 5/2016 | Takimoto | B32B 7/12 |
| 2002/0006765 | A1 * | 1/2002 | Michel | B23K 26/359 451/28 |
| 2002/0012780 | A1 * | 1/2002 | Yuyama | B32B 15/08 428/216 |
| 2002/0197421 | A1 * | 12/2002 | Yamazaki | C03B 33/0235 428/1.1 |
| 2003/0116597 | A1 * | 6/2003 | Gao | B26D 1/0006 225/2 |
| 2003/0119968 | A1 * | 6/2003 | Hara | C08L 79/08 524/495 |
| 2004/0251290 | A1 * | 12/2004 | Kondratenko | B23K 26/14 225/2 |
| 2006/0148212 | A1 * | 7/2006 | Fukuyo | B23K 26/0853 438/463 |
| 2006/0151450 | A1 * | 7/2006 | You | C03B 33/093 219/121.67 |
| 2007/0151962 | A1 * | 7/2007 | Doll | C03B 33/091 219/121.72 |
| 2008/0050888 | A1 * | 2/2008 | Garner | B23K 26/38 438/463 |
| 2010/0089882 | A1 * | 4/2010 | Tamura | B23K 26/0608 219/121.69 |
| 2010/0192634 | A1 * | 8/2010 | Higuchi | B29C 66/7465 65/60.1 |
| 2011/0023548 | A1 * | 2/2011 | Garner | B32B 17/06 65/106 |
| 2011/0138857 | A1 * | 6/2011 | Numata | C03B 33/037 65/28 |
| 2011/0177290 | A1 * | 7/2011 | Tomamoto | B32B 17/064 428/142 |
| 2011/0177325 | A1 * | 7/2011 | Tomamoto | B65H 18/28 428/332 |
| 2012/0024928 | A1 * | 2/2012 | Matsumoto | C03B 35/189 225/2 |
| 2012/0040146 | A1 * | 2/2012 | Garner | C03B 33/091 428/192 |
| 2012/0131962 | A1 * | 5/2012 | Mitsugi | C03B 33/0235 65/112 |
| 2012/0135847 | A1 * | 5/2012 | Fukasawa | B28D 1/221 501/11 |
| 2012/0199625 | A1 * | 8/2012 | Qi | B26D 3/08 225/2 |
| 2013/0126576 | A1 * | 5/2013 | Marshall | C03B 33/033 225/2 |
| 2014/0054348 | A1 * | 2/2014 | Teranishi | C03B 33/0215 225/2 |

FOREIGN PATENT DOCUMENTS

| | | |
|---|---|---|
| JP | 2005-263578 | 9/2005 |
| JP | 2008-115067 | 5/2008 |
| JP | 2008-127223 | 6/2008 |
| JP | 2009-040665 | 2/2009 |
| JP | 2010-132531 | 6/2010 |
| JP | 2010-232603 | 10/2010 |
| WO | 02/14229 | 2/2002 |
| WO | 2010/038758 | 4/2010 |
| WO | 2010/135614 | 11/2010 |

OTHER PUBLICATIONS

International Preliminary Report on Patentability and Written Opinion of the International Searching Authority dated Dec. 27, 2013 in International (PCT) Application No. PCT/JP2011/063162.
Chinese Office Action dated Mar. 3, 2015 in corresponding Chinese Patent Application No. 201180064340.5 with English Translation.
Office Action dated Oct. 19, 2015, in corresponding Chinese Application No. 201180064340.5 with English translation.
Korean Office Action dated May 30, 2017 in counterpart Korean Patent Application 10-2013-7015942 with Machine Translation.

* cited by examiner

METHOD FOR CUTTING PLATE-LIKE GLASS, AND CUTTING DEVICE THEREFOR

TECHNICAL FIELD

The present invention relates to a method and apparatus for cutting a glass sheet by performing localized heating and cooling along a preset cutting line of the glass sheet.

BACKGROUND ART

As is well known, flat panel displays (FPDs) have become a mainstream of image display devices in recent years, the FPDs being typified by a liquid crystal display (LCD), a plasma display (PDP), a field emission display (FED), an organic light-emitting diode display (OLED), and the like. Progress is being made toward reducing the weight of those FPDs, and hence glass substrates used for the FPDs are also currently becoming thinner.

Further, there is a growing use of an organic light-emitting diode as a plane light source, such as a backlight of LCD and a light source for interior illumination, which emits only monochrome (for example, white) light, unlike a display that uses TFTs to blink light of three fine primary colors. Further, when an illumination device that uses the organic light-emitting diode includes a glass substrate having flexibility, a light-emitting surface is freely deformable. Therefore, from the viewpoint of ensuring sufficient flexibility, there is also promoted further thinning of the glass substrate (forming the glass substrate into a glass film) to be used for the illumination device.

In general, a method of cutting (or cleaving) the glass substrate to be used for those FPDs and illumination devices involves a scribing step of forming a scribe having a predetermined depth in a front surface or a back surface of the glass substrate, followed by a breaking step of separating the glass substrate by applying a bending moment across the scribe.

As an example of improvement for this type of glass substrate cutting method, Patent Literatures 1 and 2 disclose a method that involves forming a scribe by generating a crack in a front surface layer of the glass substrate due to a thermal stress through a combination of preceding laser beam irradiation and subsequent cooling with a coolant, followed by snapping (breaking) performed through use of mechanical means with the scribe defined as a boundary. Further, as a characteristic structure thereof, Patent Literatures 1 and 2 disclose that an adhesive layer and liquid filler having high thermal conductivity are located in a region immediately below the preset scribe formation line of the glass substrate.

Further, Patent Literature 3 discloses such a full-body cleaving method that thermal stress cleaving for a workpiece made of a brittle material (for example, glass substrate to be used for FPDs) is performed in separate steps that involve distribution of a thermal stress and propagation of a crack at a speed corresponding to a stress propagation rate as an upper limit, and a temperature distribution is formed by combining the heating through laser beam irradiation and the cooling through thermal conduction.

CITATION LIST

Patent Literature 1: JP 2008-115067 A
Patent Literature 2: JP 2008-127223 A
Patent Literature 3: JP 2009-40665 A

SUMMARY OF INVENTION

Technical Problems

In the glass substrate cleaving method disclosed in Patent Literatures 1 and 2, however, basically, similarly to the conventional general methods, the scribe is formed in the front surface layer of the glass substrate, and so-called snapping is performed with the scribe defined as a boundary. Therefore, microcracks and the like are generated in a cut end surface, resulting in a drawback of deterioration in surface property of the cut end surface. Further, this cleaving method requires the scribe forming step using the combination of the laser beam irradiation and the coolant, and also requires the snapping step, and hence the cleaving work becomes troublesome and the apparatus becomes complicated, thus leading to critical problems such as decrease in productivity and increase in cost. Further, when continuously cleaving a band-like glass sheet that is delivered continuously, this cleaving method has a drawback of forcing extremely difficult work to be carried out.

In the cleaving method disclosed in Patent Literature 3, on the other hand, only propagating the initial crack due to a thermal stress to cut (fully cut) the full body of the glass substrate needs to be executed so as to complete the cleaving work so that the forming work for the scribe is unnecessary, and hence higher-speed cleaving work can be expected. In addition, the cleaved end surface can be formed into a mirror-finished surface or a surface having surface property equivalent thereto, and hence an appropriate cleaved end surface can be expected. However, this literature does not disclose or suggest any specific manner of supporting the glass substrate, thus lacking details of the method for performing appropriate full-body thermal stress cleaving.

That is, in order to securely perform appropriate full-body thermal stress cleaving, the manner of supporting the glass substrate is an extremely important factor. In a conventional technology, however, as illustrated in FIG. 11a, in general, a glass substrate g is placed on an upper surface of a surface plate 20, and as indicated by the arrow "z", the localized heating through use of the laser or the like and the cooling of the heated region through use of the cooling water or the like are performed from the top of the glass substrate g, to thereby propagate the initial crack. Note that, this method has conventionally been carried out by the inventors of the present invention for a long period of time, and has never been disclosed in a publication or the like.

In such a simple method, however, the following situation arises. Specifically, when the localized heating is performed on the glass substrate g, as illustrated in FIG. 11b, a heated portion ga of the glass substrate g expands to project upward, and when the cooling is then performed on the glass substrate g, on the other hand, as illustrated in FIG. 11c, a cooled portion gb of the glass substrate g contracts to be depressed. Further, when the depressed portion gb is generated along with the cooling in the glass substrate g at a position on the surface plate 20, there arises such a situation that the initial crack propagates in a meandering manner or in an improper direction due to interference from the surface plate 20, resulting in a problem in that the glass substrate g is not cleaved accurately along the preset cleaving line. In addition, the glass substrate g is brought into surface contact or substantially brought into surface contact with the surface plate 20, and hence the heat is absorbed into the surface plate 20 to hinder sufficient localized heating. Even when the cooling is performed in this state, the temperature gradient is insufficient to deteriorate the thermal efficiency. As a result, there arises a trouble of still hindering the accurate cleaving along the preset cleaving line. The above-mentioned situations are more remarkable when the glass substrate g is thin.

Further, the full-body thermal stress cleaving requires a large amount of heat, and hence, at the time of the localized heating, the contact state between the support member, such as the surface plate, and the glass substrate is extremely important, but in actuality, no appropriate measures have been taken from this point of view. In this case, the above-mentioned technologies disclosed in Patent Literatures 1 and 2 are not intended for the full-body thermal stress cleaving, and there is no significant need to take measures against the heat loss at the time of the localized heating. Therefore, in view of solving the problem described above, the manner of supporting the glass substrate disclosed in Patent Literatures 1 and 2 leads to an increase in adverse effect.

Specifically, in the manner of supporting the glass substrate according to the cleaving method disclosed in those literatures, the adhesive layer and the like having high thermal conductivity are located in the region immediately below the preset scribe formation line of the glass substrate, and hence, when the laser beam is radiated so as to form the scribe in the front surface of the glass substrate, a large amount of heat generated by the laser beam is transferred to the lower structures (in those literatures, other glass substrate, support member for supporting this glass substrate, and the like) via the adhesive layer and the like. Therefore, even when the cooling is performed on the region heated by the laser beam, a sufficient temperature gradient cannot be obtained, resulting in a problem of lack of the stress necessary to propagate the crack for the scribe formation.

In addition, when the full-body cutting of the glass substrate is to be performed in the above-mentioned manner of supporting the glass substrate, an unreasonably large amount of heat is transferred from the glass substrate to the lower structures in the region heated by the laser beam, and hence the thermal efficiency decreases so that the temperature gradient becomes even insufficient. As a result, there arises a problem in that it becomes difficult or impossible to perform the full-body thermal stress cleaving that involves the propagation of the crack.

In view of the above-mentioned circumstances, the present invention has a technical object to take, when cutting a full body of a glass sheet, such as a glass substrate and the like, by performing localized heating and cooling along a preset cutting line, appropriate measures against lack of a stress necessary to cut the glass sheet and deformation due to the heating and the cooling by providing an appropriate manner of supporting the glass sheet.

Solution to Problems

According to the present invention devised to achieve the above-mentioned technical object, there is provided a method of cutting a glass sheet, the method comprising cutting a full body of the glass sheet by forming an initial crack on a preset cutting line of the glass sheet that is supported by a support member from a back surface side of the glass sheet, followed by propagating the initial crack while passing through the glass sheet from a front surface to the back surface thereof due to a tensile stress generated through localized heating along the preset cutting line and cooling of a heated region that is formed through the localized heating, the glass sheet being supported by the support member from the back surface side through an intermediation of an elastic sheet having low thermal conductivity.

According to this structure, as the heated region formed through the localized heating of the glass sheet and the cooled region formed through the cooling of the heated region move in a scanning manner along the preset cutting line, the region in which the tensile stress (thermal stress) is generated also moves along the preset cutting line. Thus, the initial crack propagates along the preset cutting line to cut (fully cut) the full body of the glass sheet. In such a cutting process, the glass sheet is supported by the support member from the back surface side through an intermediation of the elastic sheet having low thermal conductivity, and hence the large amount of heat generated through the localized heating of the glass sheet is less transferred to the support member due to the low thermal conductivity, that is, high heat insulation property of the elastic sheet. Thus, the temperature gradient caused by the localized heating and the cooling can be secured sufficiently, and hence smooth and appropriate full-body cutting of the glass sheet may be performed while enhancing the thermal efficiency. In other words, a large amount of heat is necessary for the full-body cutting of the glass sheet utilizing the localized heating and the cooling, and hence, when most of the heat is absorbed into the support member, the heat is wasted, further causing a trouble in achieving smooth full-body cutting. In view of this, in the present invention, the low thermal conductivity of the elastic sheet is effectively utilized to achieve the sufficient temperature gradient that is caused along with the localized heating and the cooling for the glass sheet, and hence the tensile stress (thermal stress) necessary for the full-body cutting can be secured to the extent possible. As described above, the glass sheet is cut under a state in which the thermal efficiency is enhanced, and hence due to a synergetic effect produced together with the full-body cutting, higher-speed work is promoted, resulting in a significant advantage to obtain higher productivity and the like. In addition, even when a portion of the glass sheet in the vicinity of the preset cutting line is deformed due to a significant thermal gradient, there is no trouble in supporting the glass sheet from the fact that the elastic sheet provided on the back surface side is deformed in conjunction with the deformation of the portion of the glass sheet. Thus, the full-body cutting can be performed along the preset cutting line with high accuracy. Note that, the elastic sheet is interposed, and hence the trouble such as a flaw that may be generated in the back surface of the glass sheet is avoided. As a result, there is no risk of the decrease in strength of the glass sheet. Further, in the full-body cutting, a force for tearing the glass sheet needs to be applied on both sides of the running direction of the crack. In this case, if the glass sheet is directly sucked and held on the support member by utilizing negative pressure suction or the like, the tear force applied to the glass sheet is reduced. When the elastic sheet is interposed on the back surface side of the glass sheet as in the present invention, however, there is no factor in reducing the tear force applied to the glass sheet, and hence the full-body cutting can be performed efficiently by appropriately utilizing the tear force thus generated effectively.

In this case, it is preferred that the elastic sheet have lower thermal conductivity than the support member.

With this structure, the above-mentioned effect of suppressing the thermal conduction from the glass sheet to the support member can be produced more securely.

In the structure describe above, the elastic sheet may comprise an organic sheet (organic resin sheet). In this case, it is preferred that a material for the organic sheet be polyethylene, polyester, polyamide, polypropylene, or the like, or a copolymer thereof, a polymer alloy thereof, or a polymer alloy thereof with any other synthetic high polymer. Further, it is preferred that the organic sheet be made of a foamed resin, a non-woven fabric, or the like. Still further, a pulp sheet or the like may be used as the organic sheet.

With this structure, when the full-body cutting of the glass sheet is to be performed due to the thermal stress, the organic sheet has both elasticity suitable for the deformation of the glass sheet and low thermal conductivity suitable for the heat insulation against the support member, and hence the organic sheet may totally exert an excellent function as a sheet to be interposed between the glass sheet and the support member.

In the structure described above, the following method may be employed. Specifically, the glass sheet comprises a band-like glass sheet to be delivered continuously, the elastic sheet comprises a band-like elastic sheet to be delivered continuously together with the band-like glass sheet, the preset cutting line extends along a delivery direction of the band-like glass sheet, and the cutting the full body of the glass sheet comprises continuously cutting a full body of the band-like glass sheet along the preset cutting line.

With this structure, it is possible to perform the full-body cutting of the continuously delivered band-like glass sheet along the delivery direction thereof, which has conventionally been impossible. Therefore, unlike the conventional technology, there is no need to perform the cutting under a state in which the length of one side of the rectangular glass substrate is restricted, and hence the cutting efficiency is enhanced significantly, resulting in an increase in variety of handling and usage of the glass sheet after the cutting.

Then, in a case of performing such continuous cutting, it is preferred that the support member be driven so as to continuously deliver the band-like glass sheet together with the band-like elastic sheet.

With this structure, the band-like glass sheet is delivered together with the band-like elastic sheet along with the drive of the support member for delivery, and hence sliding movement or the like is less liable to occur between the support member and the band-like elastic sheet and between the band-like elastic sheet and the band-like glass sheet, with the result that the risk of a scratch or the like of the glass sheet is eliminated, and the glass sheet is delivered stably. Thus, the glass quality is improved, and the cutting work can be performed at higher speed and in a smoother manner.

Further, in a case of performing such continuous cutting, the preset cutting line may be provided (imaginarily) at a position for continuously separating the band-like glass sheet at an arbitrary portion in a width direction thereof.

With this structure, the band-like glass sheet can be separated at an arbitrary portion in the width direction (direction orthogonal to the delivery direction), and hence a plurality of band-like glass sheets having desired dimensions in the width direction can be obtained from the band-like glass sheet that is formed to have a large dimension in the width direction. Thus, glass sheets having required widths can be manufactured rapidly and efficiently while enhancing the performance of forming the band-like glass sheet in the forming apparatus.

Still further, in a case of performing such continuous cutting, the preset cutting line may be provided at positions for continuously cutting off selvage portions formed at both ends of the band-like glass sheet in the width direction thereof.

With this structure, the work of cutting off the selvage portions that are unnecessary thick portions of the glass sheet can be performed continuously while maintaining smooth forming work for the band-like glass sheet in the forming apparatus as in the conventional technology. Thus, the work of cutting off the selvage portions can be performed efficiently and smoothly.

Yet further, in a case of performing the continuous cutting described above, the band-like glass sheet to be delivered continuously may comprise a band-like glass sheet after being cooled through an annealing zone of a forming apparatus.

With this structure, during the continuous delivery of the band-like glass sheet formed through a series of continuous forming steps that involve forming molten glass in the forming apparatus and cooling the resultant glass through the annealing zone, the full body of the glass sheet is continuously cut along with the localized heating and the cooling. Thus, the steps of forming the band-like glass sheet in the forming apparatus and the full-body cutting of the glass sheet are performed as a series of continuous works, and the work efficiency is enhanced significantly. Note that, it is preferred that the forming apparatus be an apparatus capable of carrying out a downdraw method, in particular, an overflow downdraw method. However, a forming apparatus capable of carrying out a float method or the like is not excluded.

Yet further, in a case of performing such continuous cutting, the band-like glass sheet to be delivered continuously may be rolled into a roll shape around a roll core while the full body of the band-like glass sheet is being continuously cut along the preset cutting line.

With this structure, as described above, the band-like glass sheet after cutting off the selvage portions or each of the band-like glass sheets separated so that the dimensions in the width direction become desired dimensions is rolled into a roll shape around the roll core. Thus, particularly a band-like thin glass sheet can easily be stored and packed into a compact shape. Note that, it is preferred that the band-like glass sheets after being separated in the width direction be rolled into a roll shape around different roll cores while delivering the band-like glass sheets in different directions.

In the structure describe above, the elastic sheet may be cut along with the cutting the full body of the glass sheet.

With this structure, the glass sheet and the elastic sheet can be cut in an aligned manner at the same position in the width direction. In this operation, specifically, when the glass sheet is subjected to the full-body cutting by performing, for example, the localized heating through use of the laser irradiation and the cooling through use of the coolant, the elastic sheet is cut (fused) due to the laser beam passing through a gap formed in the cut glass sheet.

In this case, when the band-like glass sheet to be delivered continuously is rolled into the roll shape around the roll core while the full body of the band-like glass sheet is being continuously cut along the preset cutting line, it is preferred that the band-like elastic sheet cut along with the cutting the full body of the band-like glass sheet be rolled into the roll shape around the roll core in a state of being overlaid on the band-like glass sheet.

With this structure, the band-like glass sheet is protected by the band-like elastic sheet (for example, organic sheet), which may contribute to, for example, the prevention of a flaw that may be generated due to the contact between portions of the glass sheet. Further, in a glass sheet roll thus obtained by rolling the glass sheet, the band-like elastic sheet may also serve as a cushioning material for the band-like glass sheet, thus producing excellent effects for handling easiness, impact mitigation, and the like at the time of packing and transporting the glass sheet roll.

In the structure described above, retaining members may be arranged on a front surface side of the glass sheet so as to be opposed to the support members, respectively, the retaining members being configured to sandwich the glass sheet between the retaining members and the support members.

With this structure, even when the glass sheet takes a vertical posture as well as a flat posture, the full-body cutting can be performed along with the localized heating and the cooling under a state in which the glass sheet is sandwiched and held between the support members and the retaining members, with the result that appropriate cutting may be performed irrespective of the posture of the glass sheet. Note that, in this case, the retaining members may be substantially the same members and have substantially the same structure as the support members. Further, it is preferred that an elastic sheet having low thermal conductivity be interposed between the retaining members and the glass sheet.

In the structure described above, it is preferred that the glass sheet have a thickness of 200 μm or less.

Specifically, in a case of a thin glass sheet (glass film) having a thickness of 200 μm or less, it is difficult to prevent the glass sheet from shattering, for example, when forming a scribe by rotating a wheel cutter at a small pressing force. Further, when the pressing force of the above-mentioned wheel cutter becomes larger than necessary, microcracks that cause decrease in strength of the cut end surface are easily formed in the horizontal direction in addition to a vertical crack that is necessary for snapping. In addition, in a case of performing the snapping along the preset cutting line extending in the longitudinal direction while rolling the glass film having a thickness of 200 μm or less into a roll shape, the scribe needs to be formed over a long distance, and hence the work becomes troublesome and difficult inevitably. As described above, the problems arising in the case of performing the snapping by forming the scribe in the glass film having a thickness of 200 μm or less can be solved all at once by the above-mentioned method according to the present invention. As a result, the thin glass sheet of this type can be obtained with high bending strength and high quality. Further, in a case of cutting a glass film having a thickness of, for example, 200 μm or less, the elastic sheet is interposed on the back surface side of the glass film, and hence the glass film is not restrained by the suction or friction occurring on the support surface of the support member. Thus, the glass film may maximally expand through the localized heating, and maximally contract through the subsequent cooling. Further, a difference between the expansion and the contraction is a factor in generating a tensile stress for the full-body cutting that involves the propagation of the initial crack, and hence the glass film can be cut by effectively utilizing the maximal tensile stress generated through the significantly efficient heating and cooling.

In the structure described above, it is preferred that the localized heating be performed through use of a carbon dioxide laser.

As described above, when the carbon dioxide laser is used as localized heating means for the preset cutting line of the glass sheet, the glass (in particular, alkali-free glass) can absorb the energy of the laser efficiently. Thus, the localized heating can be performed in a simple manner under a stable state, and the cost is reduced as well.

When using the method described above, a glass sheet having a thickness of 200 μm or less may be obtained by cutting at least one side thereof.

The glass sheet (glass film) has high bending strength of the cut surface thereof, and can therefore withstand a large tensile stress that is generated due to, for example, bending at a small curvature radius. Thus, the glass sheet can be used in a wider range and handled more easily as compared to the conventional glass sheet.

Further, when using the method described above, a glass sheet having a bending strength of a cut surface of 200 MPa or more and a thickness of 200 μm or less may be obtained by cutting at least one side thereof.

The glass sheet (glass film) has the bending strength of the cut surface of 200 MPa or more, and can therefore securely withstand a large tensile stress that is generated due to, for example, bending at a smaller curvature radius. In addition, the bending strength is clearly described as high as 200 MPa or more, and hence the glass sheet can be handled in a specific and appropriate manner.

Yet further, when using the method described above, a glass sheet roll may be obtained by rolling a glass sheet into a roll shape around a roll core.

According to this glass sheet roll, the storage and the handling are facilitated, and the transportation efficiency is also enhanced. Note that, in a case of performing the full-body cutting along the preset cutting line extending in the longitudinal direction while executing a method of drawing the band-like glass sheet from one glass sheet roll and synchronously rolling the band-like glass sheet into a roll shape around another roll core (roll-to-roll), the process may be carried out smoothly and easily.

Yet further, a glass sheet obtained by the method described above may comprise an organic layer formed on at least one of a front surface, a back surface, and a cut surface thereof.

Specifically, when the organic layer is formed on the front surface, the back surface, and the cut surface of the obtained glass sheet, the strengths of the front surface, the back surface, and the cut surface are enhanced, and hence, for the glass sheet having a thickness of, for example, 200 μm or less (glass film), a sufficient strength can be secured against deflection, with the result that the flexibility of the thin glass sheet can be utilized effectively. In this case, the above-mentioned "organic layer" encompasses an organic resin film to be adhered through an intermediation of an adhesive layer or a pressure-sensitive adhesive layer.

According to the present invention devised to achieve the above-mentioned technical object, there is provided an apparatus for cutting a glass sheet, the apparatus having a structure in which a full body of the glass sheet is cut by forming an initial crack on a preset cutting line of the glass sheet that is supported by a support member from a back surface side of the glass sheet, followed by propagating the initial crack while passing through the glass sheet from a front surface to the back surface thereof due to a stress generated through localized heating along the preset cutting line and cooling of a heated region that is formed through the localized heating, in which the glass sheet is supported by the support member from the back surface side through an intermediation of an elastic sheet having low thermal conductivity.

The descriptions including those of the actions and effects of the apparatus having this structure are substantially the same as the descriptions of the above-mentioned method according to the present invention, which includes substantially the same structural elements as this apparatus.

Advantageous Effects of Invention

As described above, according to the present invention, the glass sheet is supported by the support member from the back surface side through an intermediation of the elastic sheet having low thermal conductivity, and hence the large amount of heat generated through the localized heating of the glass sheet is less transferred to the support member due to the low thermal conductivity, that is, the high heat insulation property of the elastic sheet. Thus, the temperature gradient caused by the localized heating and the cooling can be secured sufficiently, and hence smooth and appropriate full-body cutting of the glass sheet may be performed while enhancing the thermal efficiency. In addition, even when a portion of the glass sheet in the vicinity of the preset cutting line is deformed due to a significant thermal gradient, the elastic sheet provided on the back surface side of the glass sheet is deformed in conjunction therewith. Thus, there is no trouble in supporting the glass sheet, and the full-body cutting can be performed along the preset cutting line with high accuracy.

DESCRIPTION OF EMBODIMENTS

Embodiments of the present invention are hereinafter described with reference to the accompanying drawings. Note that, in the following embodiments, an object to be cleaved is assumed as a glass sheet having a thickness of 200 µm or less, which is to be used for a FPD, an organic light-emitting diode illumination device, or a solar cell, that is, a glass film.

Figure 1:
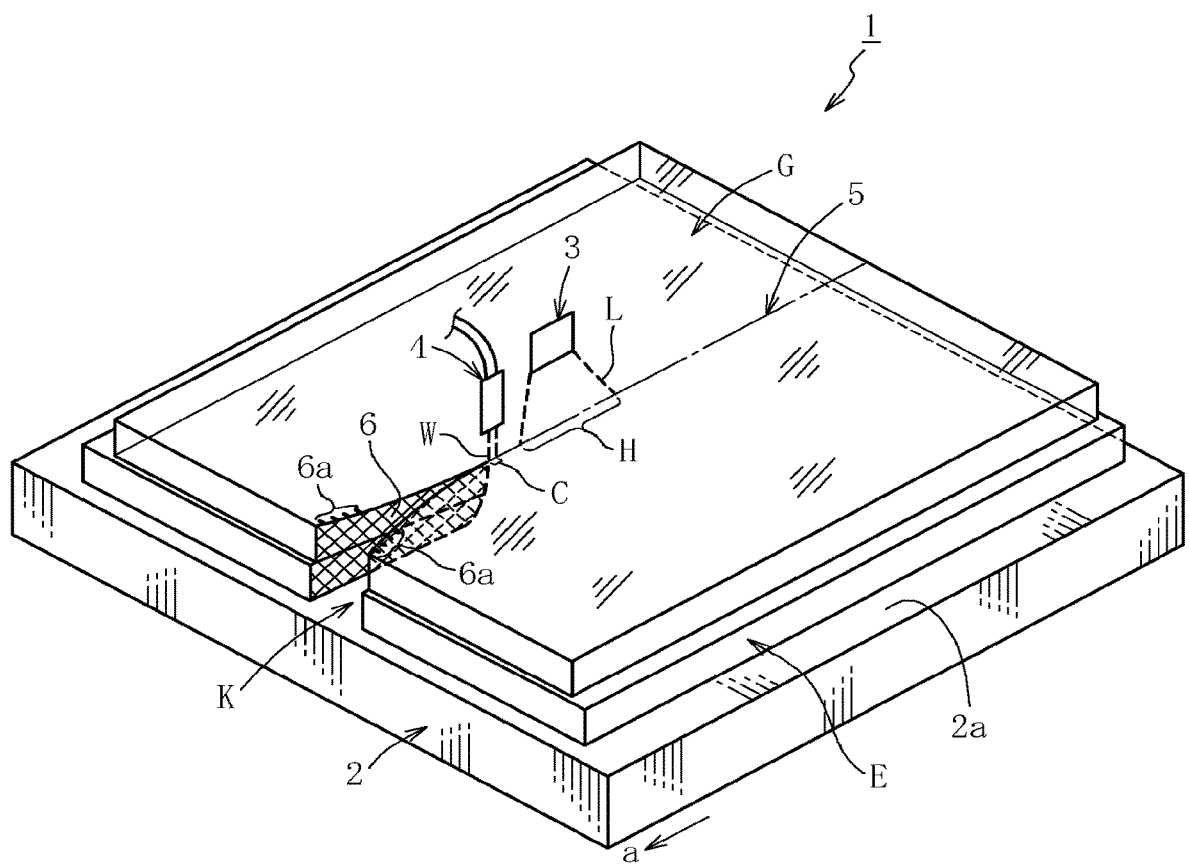
FIG. 1 A schematic perspective view illustrating a practical situation of a cutting apparatus for a glass sheet and a cutting method therefor according to a first embodiment of the present invention.

FIG. 1 is a schematic perspective view illustrating a practical situation of a cutting apparatus for a glass sheet and a cutting method therefor according to a first embodiment of the present invention, which defines a basic structure of the present invention. As illustrated in FIG. 1, a cutting apparatus 1 according to the first embodiment comprises a support member 2 formed of a surface plate, a flat plate, or the like that is made of a material having high rigidity, such as a metal, an elastic sheet E having low thermal conductivity (or heat insulation property), which is laid on a support surface 2a of the support member 2, localized heating means 3 for performing localized heating by radiating a laser beam L onto a glass sheet G, which is placed on the elastic sheet E, from a front surface side of the glass sheet G, and cooling means 4 for jetting cooling water W to a heated region H, which is formed through the heating by the localized heating means 3, from the front surface side.

In this case, the elastic sheet E is an organic sheet having lower thermal conductivity than the support member 2 (support surface 2a), and a material for the elastic sheet E is polyethylene, polyester, polyamide, polypropylene, or the like, or a copolymer thereof, a polymer alloy thereof, or a polymer alloy thereof with any other synthetic high polymer. Further, it is preferred that the elastic sheet E be made of a foamed resin or a non-woven fabric. Note that, in this embodiment, a carbon dioxide laser is used as the localized heating means 3, but there may be used other means capable of performing the localized heating, such as an electrical heating wire and hot air blast. Further, the cooling means 4 is configured to jet the cooling water W as a coolant due to an air pressure or the like, and this coolant may be, for example, a cooling liquid other than the cooling water, a gas such as an air and an inert gas, a mixture of a gas and a liquid, or further, a mixture of a solid such as ice and dry ice and a fluid such as a liquid and a gas.

A preset cutting line 5 is formed on the glass sheet G (imaginarily), and the support member 2 is movable in the arrow "a" direction (direction along the preset cutting line 5) together with the elastic sheet E and the glass sheet G. Further, as for the heated region H formed through the laser irradiation by the localized heating means 3 and a cooled region C formed through the cooling water jetting by the cooling means 4, the heated region H scans the preset cutting line 5 from one end portion side of the glass sheet G while moving ahead of the cooled region C. In this case, crack forming means (crack imparting means) (not shown) forms an initial crack 6a on the preset cutting line 5 at one end portion of the glass sheet G, and hence the initial crack 6a propagates due to a stress (thermal stress) generated at the time of scanning movement of the heated region H and the cooled region C described above. Thus, a cut surface 6 passing through the glass sheet G from the front surface to the back surface is formed on the preset cutting line 5 while propagating along the preset cutting line 5. At the same time, the elastic sheet E is also cut (fused) along the preset cutting line 5 through the laser irradiation by the localized heating means 3.

In this case, in the process in which the initial crack 6a of the glass sheet G propagates so that the cut surface 6 passing through the glass sheet G from the front surface to the back surface is formed on the preset cutting line 5 while propagating along the preset cutting line 5, a force for tearing the glass sheet G is applied on both sides of (in a direction perpendicular to) the running direction of the crack, and hence as exaggerated in FIG. 1, there is formed a gap K opened on one end portion side (on the initial crack 6a side) of the preset cutting line 5 of the glass sheet G. Specifically, if the glass sheet G is directly sucked and held on the support member 2 by utilizing negative pressure suction or the like, the tear force applied to the glass sheet G is reduced, and hence the gap K as described above is not easily formed. When the elastic sheet E is interposed on the back surface side of the glass sheet G, however, there is no factor in reducing the tear force applied to the glass sheet G, and hence the gap K as described above is easily formed. Thus, the initial crack 6a of the glass sheet G and therefore the cut surface 6 propagate rapidly and smoothly. Note that, the elastic sheet E is also torn in a similar manner together with the glass sheet G.

In the manner as described above, the glass sheet G is separated through full-body cutting (full-body thermal stress cleaving) along the preset cutting line 5, and at the same time, the elastic sheet E is also separated through cutting along the preset cutting line 5. Note that, in this embodiment, the support member 2 is movable, and the localized heating means 3 and the cooling means 4 are held in a fixed manner. Alternatively, the support member 2 may be held in a fixed manner, and the localized heating means 3 and the cooling means 4 may be set movable.

In the cutting process as described above, the glass sheet G is supported by the support member 2 from the back surface side through an intermediation of the elastic sheet E having low thermal conductivity, and hence the large amount of heat generated when the localized heating is performed on the preset cutting line 5 of the glass sheet G is not easily transferred to the support member 2 due to the low thermal conductivity, that is, the high heat insulation property of the elastic sheet E. In particular, in this embodiment, the thermal conductivity of the elastic sheet E is lower than that of the support member 2, and hence the heat absorption from the glass sheet G to the support member 2 is suppressed suitably. Thus, the temperature gradient caused by the localized heating and the cooling can be secured sufficiently, and hence the full body of the glass sheet G can be cut smoothly and appropriately while enhancing the thermal efficiency. In addition, the low thermal conductivity of the elastic sheet E is effectively utilized to achieve the sufficient temperature gradient that is caused along with the localized heating and the cooling for the glass sheet G, and hence the lack of the stress (thermal stress) necessary for the full-body cutting of the glass sheet G can be suppressed to the extent possible. Thus, the glass sheet G is cut under a state in which the thermal efficiency is enhanced, and hence, due to a synergetic effect produced together with the full-body cutting, higher-speed work is promoted, resulting in a significant advantage to obtain higher productivity and the like.

In addition, when a portion of the glass sheet G in the vicinity of the preset cutting line 5 is deformed, in particular, depressed due to a significant thermal gradient, the elastic sheet E provided on the back surface side of the glass sheet G is deformed in conjunction therewith. Thus, there is no trouble in supporting the glass sheet G, and the full-body cutting can be performed along the preset cutting line 5 with high accuracy. Further, the elastic sheet E is interposed, and hence the trouble such as a flaw that may be generated in the back surface of the glass sheet G is avoided. As a result, the decrease in strength of the glass sheet G can be inhibited effectively.

Moreover, considering that a thin glass sheet G having a thickness of 200 µm or less is to be cut, the portion on the back surface of the glass sheet G in the vicinity of the preset cutting line 5 is not restrained by the suction or friction occurring on the support surface 2a of the support member 2. Thus, the glass sheet G may maximally expand through the localized heating, and maximally contract through the subsequent cooling. Further, a difference between the expansion and the contraction is a factor in generating a tensile stress for the full-body cutting that involves the propagation of the initial crack 6a, and hence the glass sheet G can be cleaved by effectively utilizing the maximal tensile stress generated through the significantly efficient heating and cooling.

Note that, referring to FIG. 1, the initial crack 6a is formed at one end portion of the preset cutting line 5 on the front surface of the glass sheet G, but this initial crack 6a may be formed through the end surface starting from one end portion on the front surface of the glass sheet G.

Further, in this embodiment, the elastic sheet E is cut together with the glass sheet G, but the full-body cutting may be performed only on the glass sheet G without cutting the elastic sheet E.

Figure 2:
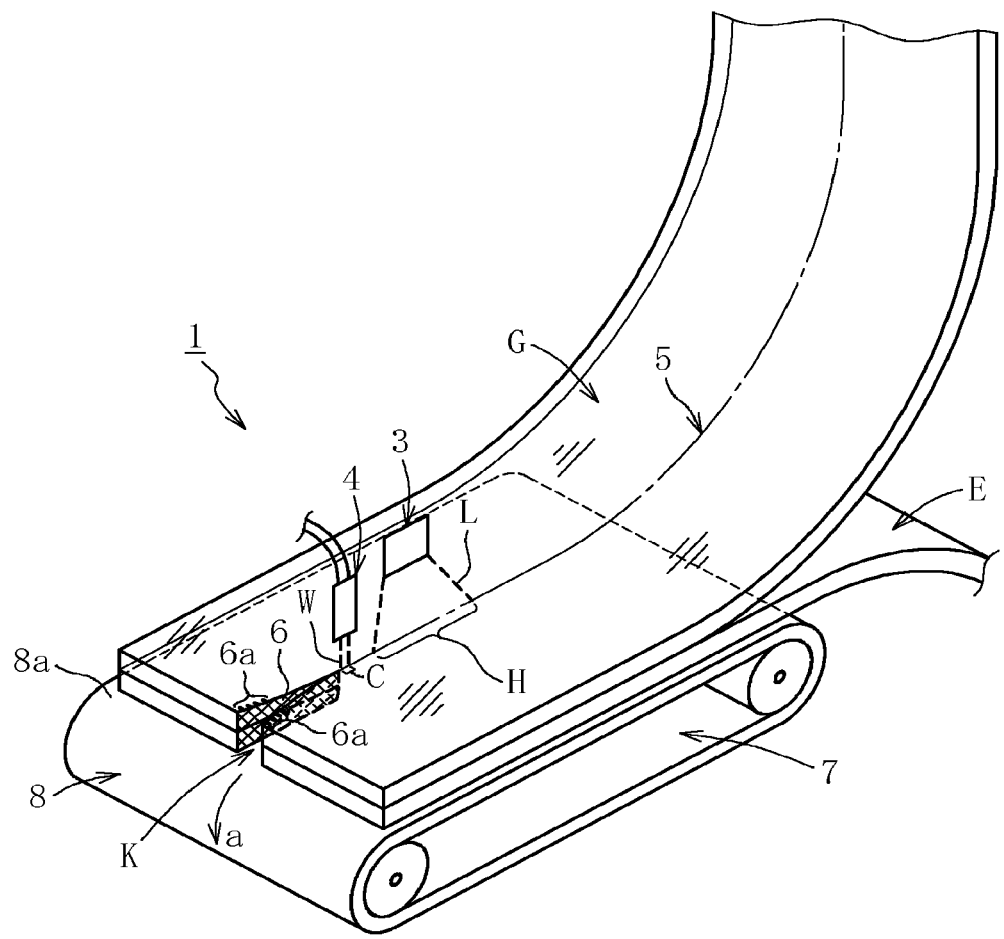
FIG. 2 A perspective view illustrating a main part of a practical situation of a cutting apparatus for a glass sheet and a cutting method therefor according to a second embodiment of the present invention.

FIG. 2 is a perspective view illustrating a main part of a practical situation of a cutting apparatus for a glass sheet and a cutting method therefor according to a second embodiment of the present invention. As illustrated in FIG. 2, a cutting apparatus 1 according to the second embodiment comprises a support member formed of a conveyance belt 8 of a conveyor 7 (may be formed of a plurality of conveyance rollers of a roller conveyor). This conveyance belt 8 is driven in the arrow "a" direction so as to deliver a band-like glass sheet G in a direction along a preset cutting line 5 through an intermediation of a band-like elastic sheet E. Thus, an outer peripheral surface of the conveyance belt 8 is set as a support surface 8a for supporting the band-like glass sheet G with the band-like elastic sheet E interposed therebetween. In addition, at a position above the preset cutting line 5 of the band-like glass sheet G, the cutting apparatus 1 comprises localized heating means 3 for performing localized heating with a laser beam L, and cooling means 4 for jetting and supplying cooling water W. In the structure as described above, the conveyance belt 8 of the conveyor 7 delivers the band-like glass sheet G, which is overlaid on the band-like elastic sheet E, so that a heated region H formed by the localized heating means 3 scans the preset cutting line 5 of the band-like glass sheet G from one end portion side thereof while moving ahead of a cooled region C formed by the cooling means 4. Thus, an initial crack 6a formed at one end portion of the band-like glass sheet G propagates so that a cut surface 6 passing through the band-like glass sheet G from the front surface to the back surface is formed on the preset cutting line 5. Along with this formation, full-body cutting (full-body thermal stress cleaving) is performed continuously. Note that, at the same time, the band-like elastic sheet E is also cut (fused), and the band-like glass sheet G and the band-like elastic sheet E are brought into a state of being cut in an aligned manner. Other structures, actions, effects, and supplementary descriptions are the same as those in the first embodiment described above, and hence common structural elements are represented by the same reference symbols in FIG. 2 and descriptions thereof are therefore omitted herein.

Figure 3:
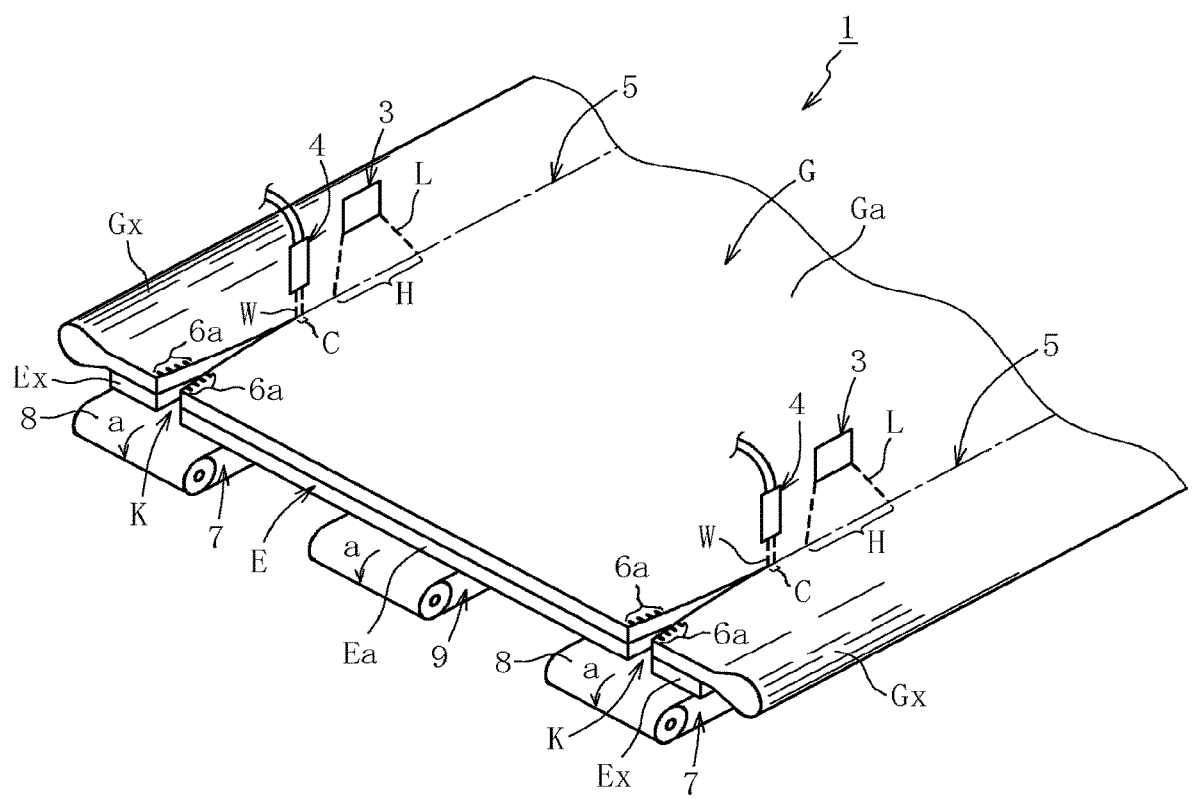
FIG. 3 A perspective view illustrating a main part of a practical situation of a cutting apparatus for a glass sheet and a cutting method therefor according to a third embodiment of the present invention.

FIG. 3 is a perspective view illustrating a main part of a practical situation of a cutting apparatus for a glass sheet and a cutting method therefor according to a third embodiment of the present invention. As illustrated in FIG. 3, a cutting apparatus 1 according to the third embodiment is configured to cut off relatively thick selvage portions Gx formed at both ends of a band-like glass sheet G in the width direction, and preset cutting lines 5 are provided at positions slightly shifted from those selvage portions Gx toward a center side in the width direction. Further, a pair of conveyors 7 for supporting and delivering a band-like elastic sheet E and the band-like glass sheet G from a back surface side thereof is arranged in regions each ranging up to portions that are situated apart by a predetermined dimension from each preset cutting line 5 toward both sides thereof. Further, on a front surface side of the band-like glass sheet G, there are arranged localized heating means 3 for performing localized heating on each preset cutting line 5, and cooling means 4 for jetting cooling water W. Note that, on the back surface side of a center region of the band-like glass sheet G and the band-like elastic sheet E in the width direction, there are installed one or more (in the example of FIG. 3, one) auxiliary conveyors 9 for preventing a slack of the band-like glass sheet G and the band-like elastic sheet E. Note that, when the dimension of the band-like glass sheet G in the width direction is small, the auxiliary conveyor 9 is not necessary, and further, a single conveyor 7 may deliver the band-like elastic sheet E and the band-like glass sheet G. Further, the pair of conveyors 7 or the single conveyor 7 may extend in the width direction so as to be capable of supporting the selvage portions Gx of the band-like glass sheet G from the back surface side, and along with this, the elastic sheet E may also extend up to the back surface side of the selvage portions Gx. Also in this case, the band-like elastic sheet E is depressed in conjunction with the relatively thick part of each selvage portion Gx, and hence the band-like glass sheet G is delivered in an accurate flat posture without causing a warp or the like. In the structure as described above, during a period in which the conveyors 7 (and auxiliary conveyor 9) deliver the band-like glass sheet G, a heated region H formed by the localized heating means 3 and a cooled region C formed by the cooling means 4 scan each preset cutting line 5 so that the band-like glass sheet G is subjected to full-body cutting at a position between an available portion Ga and each selvage portion Gx along with propagation of an initial crack 6a. In this manner, each selvage portion Gx is cut off continuously. Further, unnecessary portions Ex of the band-like elastic sheet E, which are located on a back surface side of the selvage portions Gx, are also cut off continuously from an available portion Ea in a center region in the width direction. Other structures, actions, effects, and supplementary descriptions are the same as those in the first embodiment described above, and hence common structural elements are represented by the same reference symbols in FIG. 3 and descriptions thereof are therefore omitted herein.

Figure 4:
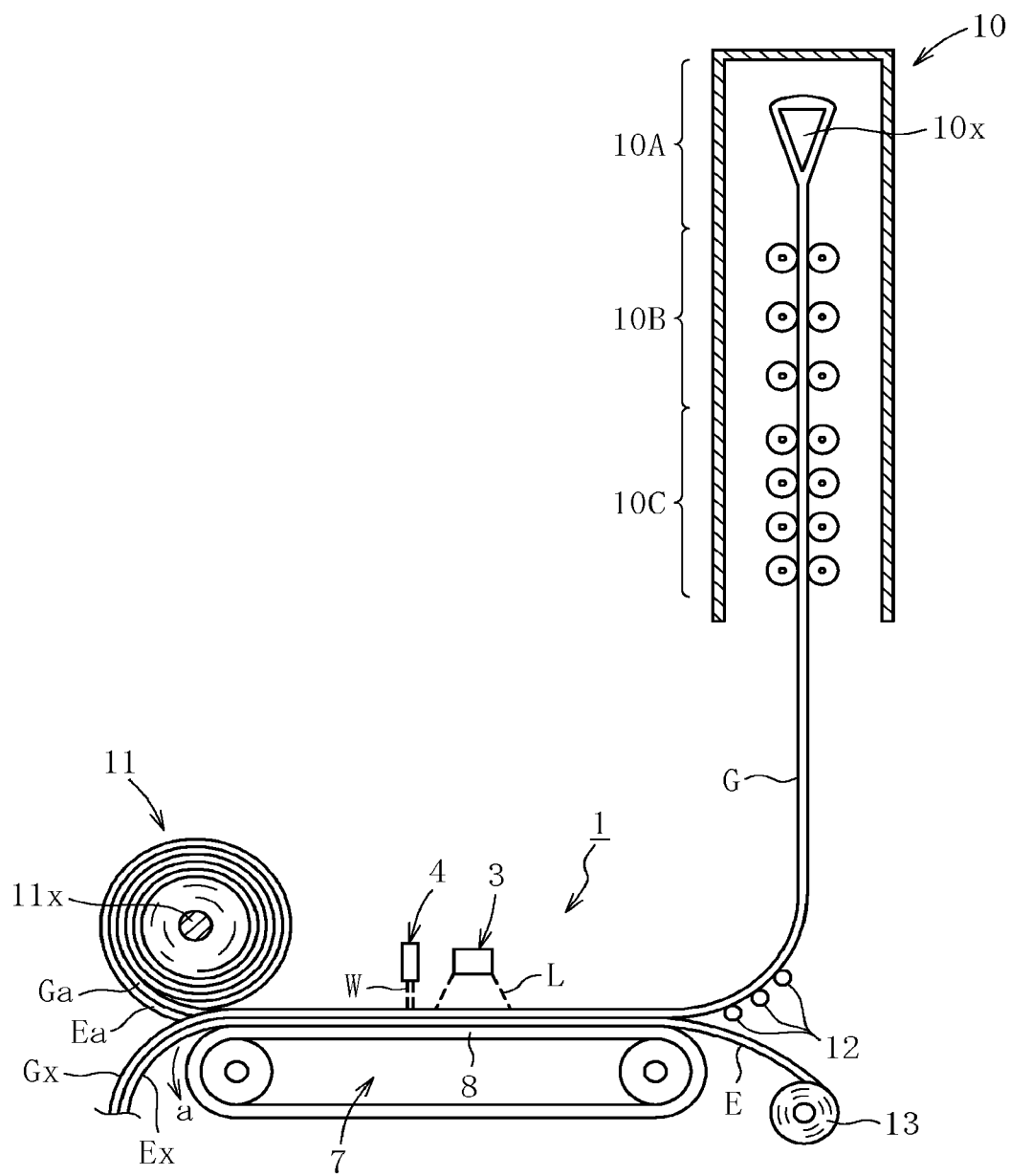
FIG. 4 A schematic side view illustrating a practical situation of a cutting apparatus for a glass sheet and a cutting method therefor according to a fourth embodiment of the present invention.

FIG. 4 is a schematic side view illustrating a practical situation of a cutting apparatus for a glass sheet and a cutting method therefor according to a fourth embodiment of the present invention. As illustrated in FIG. 4, in the fourth embodiment, the above-mentioned cutting apparatus 1 illustrated in FIG. 3 is interposed between a forming apparatus 10 for forming a band-like glass sheet G and a rolling apparatus 11 for rolling the formed band-like glass sheet G into a roll shape around a roll core 11a. Specifically, the forming apparatus 10 carries out an overflow downdraw method, and includes, in the following order from above, a forming zone 10A having a forming member 10x inside a forming furnace, an annealing zone 10B having annealing means (annealer), and a cooling zone 10C having cooling means. The band-like glass sheet G drawn downward from the cooling zone 10C of the forming apparatus 10 is delivered in a lateral direction while being smoothly curved by conversion rollers 12, and is then delivered in a state of being supported on the conveyance belts 8 of the conveyors 7 of the cutting apparatus 1 through an intermediation of a band-like elastic sheet E drawn from a sheet roll 13. During a period in which the band-like glass sheet G is thus supported and laterally delivered by the conveyance belts 8 through an intermediation of the band-like elastic sheet E, the localized heating means 3 and the cooling means 4 perform localized heating and cooling on each preset cutting line 5 so that the band-like glass sheet G is subjected to full-body cutting at a position between an available portion Ga and each selvage portion Gx, and the band-like elastic sheet E is also cut into an available portion Ea and unnecessary portions Ex. After that, the available portion Ga of the band-like glass sheet G is rolled into a roll shape around the roll core 11a of the rolling apparatus 11 under a state in which the available portion Ea of the band-like elastic sheet E is overlaid on a back surface side of the available portion Ga. When the outer diameter of the roll then becomes a predetermined value, the glass sheet G is cut in a width direction thereof. The glass sheet G is cut by, for example, snapping (breaking) the glass sheet G along a scribe formed in the width direction of the glass sheet G with a cutter. Further, the band-like elastic sheet E is also cut at the same position in the width direction with other cutting means. As a result, a glass sheet roll formed into a roll shape is obtained as a finished product having the band-like elastic sheet E serving as a cushioning material for the band-like glass sheet G. On the other hand, the selvage portions Gx of the band-like glass sheet G and the unnecessary portions Ex of the elastic sheet E are delivered downward and disposed of as a waste. Note that, the structure, actions, and effects of the cutting apparatus 1 are substantially the same as those in the third embodiment described above, and hence common structural elements are represented by the same reference symbols in FIG. 4 and descriptions thereof are therefore omitted herein.

Figure 5:
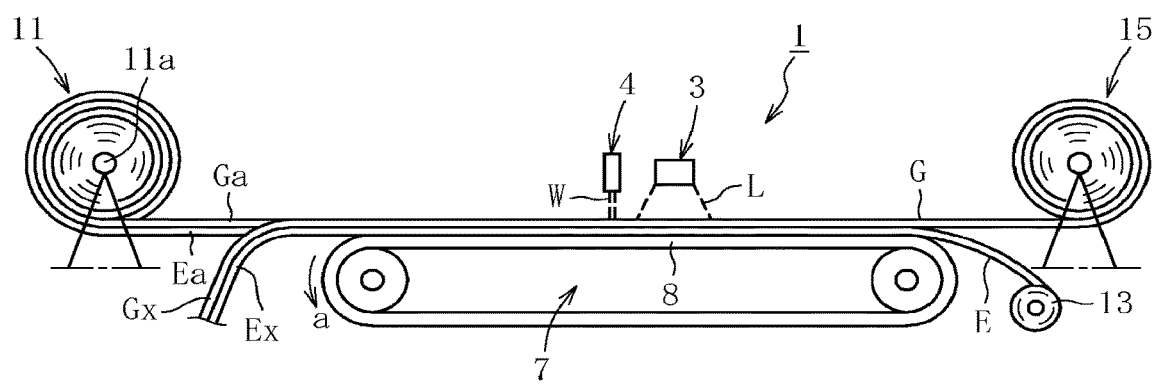
FIG. 5 A schematic side view illustrating a practical situation of a cutting apparatus for a glass sheet and a cutting method therefor according to a fifth embodiment of the present invention.

FIG. 5 is a schematic side view illustrating a practical situation of a cutting apparatus for a glass sheet and a cutting method therefor according to a fifth embodiment of the present invention. The fifth embodiment is different from the fourth embodiment described above in the following matter. Specifically, an original glass roll 15 is manufactured by rolling a band-like glass sheet G, which is drawn from the cooling zone 10C of the forming apparatus 10, into a roll shape without cutting off selvage portions Gx. Then, the band-like glass sheet G drawn from this original glass roll 15 is laterally delivered, and along with the delivery, the selvage portions Gx are cut off by the cutting apparatus 1. Through those steps, the band-like glass sheet G is rolled into a roll shape around the roll core 11a of the rolling apparatus 11, with the result that a glass sheet roll is obtained as a finished product. Also in this case, in the cutting apparatus 1, a band-like elastic sheet E drawn from a sheet roll 13 is interposed between the conveyance belts 8 of the conveyors 7 and the band-like glass sheet G, and in a glass sheet roll as a finished product, a band-like elastic sheet Ea serves as a cushioning material for a band-like glass sheet Ga. Further, the structure, actions, and effects of the cutting apparatus 1 that executes the step of cutting off the selvage portions Gx of the band-like glass sheet G are substantially the same as those of the cutting apparatus 1 according to the third embodiment described above, and hence common structural elements are represented by the same reference symbols in FIG. 5 and descriptions thereof are therefore omitted herein.

Figure 6:
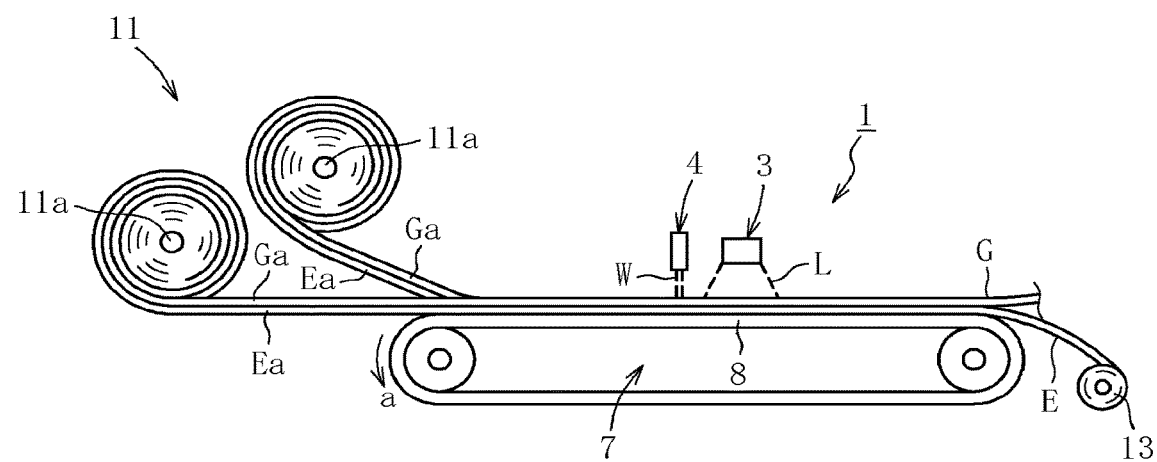
FIG. 6 A schematic side view illustrating a practical situation of a cutting apparatus for a glass sheet and a cutting method therefor according to a sixth embodiment of the present invention.

FIG. 6 is a schematic side view illustrating a practical situation of a cutting apparatus for a glass sheet and a cutting method therefor according to a sixth embodiment of the present invention. The sixth embodiment is different from the fourth embodiment or the fifth embodiment described above in the following matter. Specifically, a band-like glass sheet G drawn from the cooling zone 10C of the forming apparatus 10 or from the original glass roll 15 is laterally delivered, and along with the delivery, selvage portions Gx of the glass sheet G are cut off. Then, the glass sheet G is further subjected to a two-way division step in the cutting apparatus 1, and is rolled into a roll shape around two roll cores 11*a* of the rolling apparatus 11, with the result that two glass sheet rolls are obtained as finished products. Also in this case, in the cutting apparatus 1, a band-like elastic sheet E drawn from a sheet roll 13 is interposed between the conveyance belts 8 of the conveyors 7 and the band-like glass sheet G, and in a glass sheet roll as a finished product, a band-like elastic sheet Ea serves as a cushioning material for a band-like glass sheet Ga. Further, the structure, actions, and effects of the cutting apparatus 1 that executes the two-way division step on the band-like glass sheet G are substantially the same as those of the cutting apparatus 1 according to the second embodiment described above, and hence common structural elements are represented by the same reference symbols in FIG. 6 and descriptions thereof are therefore omitted herein.

Figure 7:
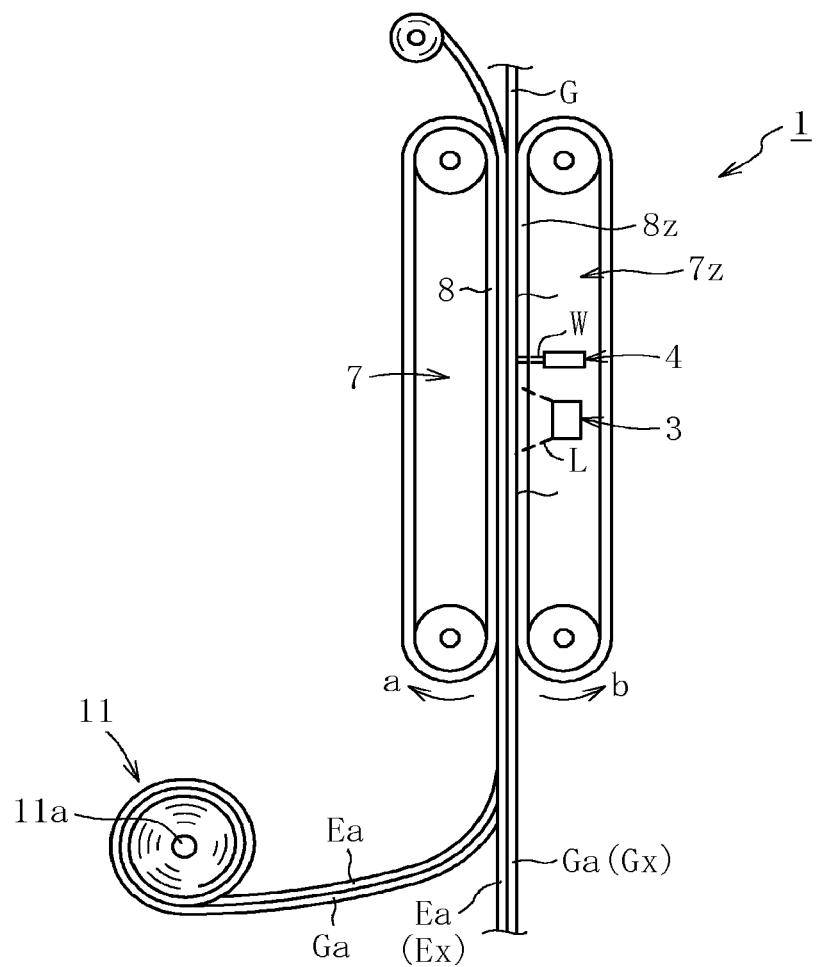
FIG. 7 A schematic side view illustrating a practical situation of a cutting apparatus for a glass sheet and a cutting method therefor according to a seventh embodiment of the present invention.

FIG. 7 is a schematic side view illustrating a practical situation of a cutting apparatus for a glass sheet and a cutting method therefor according to a seventh embodiment of the present invention. A cutting apparatus 1 according to the seventh embodiment is different from those in the second to sixth embodiments described above in the following matter. Basically, a band-like glass sheet G is supported in a state of being sandwiched by a conveyance belt 8 serving as a support member of a conveyor 7 on one side, and by a conveyance belt 8*z* serving as a retaining member of a conveyor 7*z* on another side. As another difference, the band-like glass sheet G is delivered downward in a vertical posture. Thus, the structure of the conveyance belt 8 serving as the support member is substantially the same as that of the conveyance belt 8*z* serving as the retaining member, and both the conveyance belts 8 and 8*z* are arranged to be opposed to each other and driven for delivery at the same speed in the "a" direction and the "b" direction, respectively. Note that, in such an embodiment that the conveyance belt 8*z* serving as the retaining member is brought into contact with an available portion Ga of the band-like glass sheet G, it is preferred that an organic resin film be interposed between the conveyance belt 8*z* and the band-like glass sheet G. The structure for full-body cutting of the band-like glass sheet G by the above-mentioned cutting apparatus 1, and actions and effects produced from this structure are substantially the same as those in the second to sixth embodiments described above, and hence common structural elements are represented by the same reference symbols in FIG. 7 and descriptions thereof are therefore omitted herein. Note that, the posture of the band-like glass sheet G is not particularly limited, and may be a flat posture (horizontal posture). Further, this structure is applicable to a case where a longitudinal center line of the glass sheet G is inclined from the horizontal direction. Further, also in this case, in a glass sheet roll as a finished product, a band-like elastic sheet Ea serves as a cushioning material for a band-like glass sheet Ga.

Figure 8:
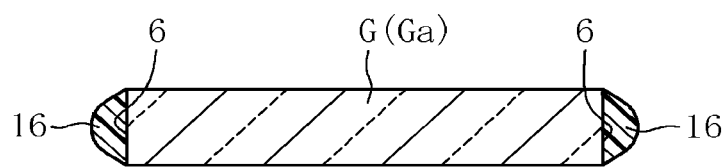
FIG. 8 A sectional view illustrating a state in which an organic layer is formed on a cut surface of a glass sheet that is cut by the cutting apparatus according to the first to seventh embodiments of the present invention.

FIG. 8 illustrates that an organic layer (preferably an organic resin layer) 16 is formed on the cut surface 6 of the glass sheet G (Ga) that is cut by the cutting apparatus 1 according to each of the embodiments described above. Note that, in the example of FIG. 8, the cut surfaces 6 are provided at both ends of the glass sheet G (Ga) in the width direction, and hence the organic layers 16 are formed at both the ends, but when the cut surface 6 is provided only at one end of the glass sheet G (Ga) in the width direction, the organic layer 16 may be formed only at the one end. With this structure, the strength of the cut surface 6 of the glass sheet G is enhanced, and hence, for a glass sheet G having a thickness of 200 μm or less, a sufficient strength can be secured against deflection, with the result that the flexibility of the thin glass sheet G can be utilized effectively.

Figure 9:
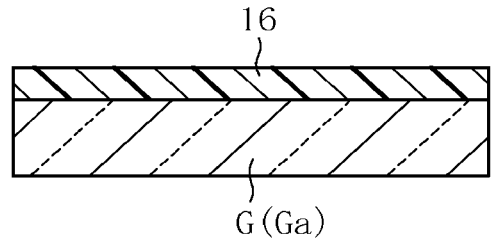
FIG. 9 A sectional view illustrating a state in which the organic layer is formed on a front surface of the glass sheet that is cut by the cutting apparatus according to the first to seventh embodiments of the present invention.

FIG. 9 illustrates that the organic layer (preferably an organic resin layer) 16 is formed on the front surface of the glass sheet G (Ga) that is cut by the cutting apparatus 1 according to each of the embodiments described above. Also in this case, the strength of the front surface of the glass sheet G (Ga) is enhanced, and hence a sufficient strength can be secured against deflection, with the result that the flexibility of the thin glass sheet G (Ga) can be utilized effectively.

Examples

Figure 10:
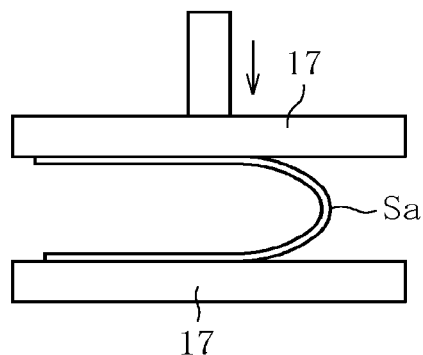
FIG. 10 A schematic view illustrating a state of carrying out evaluation of the glass sheet.
Figure 11A:
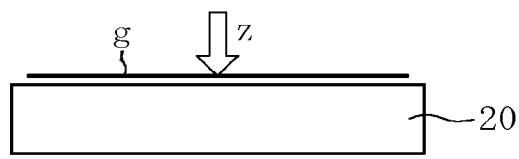
FIG. 11a A schematic front view illustrating a problem inherent in a conventional technology.
Figure 11B:
FIG. 11b A schematic front view illustrating the problem inherent in the conventional technology.
Figure 11C:
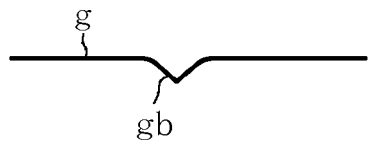
FIG. 11c A schematic front view illustrating the problem inherent in the conventional technology.

In [Example 1] of the present invention, an alkali-free glass sheet having a long side of 460 mm, a short side of 360 mm, a thickness of 200 μm, and a thermal expansion coefficient of $38 \times 10^{-7}/°$ C. within a range of 30 to 380° C. was placed on a support surface of a support member, which was formed of a surface plate or a flat plate, through an intermediation of a foamed polyethylene sheet (having a thermal conductivity of 0.03 to 0.05 W/m·K) (basically in the state illustrated in FIG. 1). Then, an initial crack was formed on a preset cutting line of the alkali-free glass sheet through use of, for example, a cemented carbide wheel tip, and then full-body cutting was performed at a speed of 200 mm/sec by irradiating the preset cutting line with an elliptical laser spot having a length of 20 mm and a width of 3 mm at a power of 60 w through use of a carbon dioxide laser serving as localized heating means, and subsequently spraying a coolant made from a mixture of an air and water as cooling means at an air pressure of 0.1 MPa and a water spray rate of 1.0 ml/min. The localized heating and cooling were repeatedly executed on portions at intervals of 20 mm in the width direction, to thereby manufacture 50 samples Sa each formed of a glass sheet having a width of 20 mm and a length of 360 mm. When the full-body cutting was performed on each of the samples Sa, the foamed polyethylene sheet was also cut (fused) at the same time. Those 50 samples Sa were inspected in a dark room at an illuminance of 200,000 lux, and glass dust and a flaw in a back surface of the glass were not observed. After that, as illustrated in FIG. 10, the strengths of those samples Sa were sequentially evaluated by two-point bending, in which each of the samples Sa was sandwiched between two plate-like members 17 and was pressed and bent into a U-shape in the longitudinal direction at a speed of 50 mm/min. This evaluation was carried out by calculating the fracture strength based on a distance between the two plate-like members 17 at the time when each of the samples Sa was broken due to the bending under pressure, and the fracture strength resulted in 200 MPa at the minimum and 500 MPa on average. This fracture strength resulted in at least three times as large an average as the fracture strength of an end surface obtained through snapping after a scribe was formed through use of a cemented carbide wheel tip as in Comparative Example 1 described later.

In [Example 2] of the present invention, a band-like glass sheet made of alkali-free glass having a length of 250 m, a width of 600 mm, a thickness of 100 μm, and a thermal expansion coefficient of $38 \times 10^{-7}/°$ C. within a range of 30 to 380° C. was supported on rubber conveyance belts of conveyors through an intermediation of a PET film (having a thermal conductivity of 0.08 to 0.17 W/m·K), and the conveyors were driven at a delivery speed of the band-like glass sheet of 200 mm/sec. Then, carbon dioxide lasers were arranged on both sides of the band-like glass sheet in the width direction, and initial cracks corresponding thereto were formed in advance on two preset cutting lines through use of, for example, a cemented carbide wheel tip (basically in the state illustrated in FIG. 3). Then, full-body cutting was performed continuously by irradiating the preset cutting lines, on which the initial cracks were formed, with elliptical laser spots having a length of 30 mm and a width of 1.5 mm at a power of 70 w through use of the two carbon dioxide lasers, and subsequently spraying a coolant made from a mixture of an air and water at an air pressure of 0.1 MPa and a water spray rate of 1.0 ml/min. In this manner, portions having a width of 50 mm that were located on both sides in the width direction were cut off. Further, when the full-body cutting was performed on those portions, the PET film was also cut (fused) at the same time. After that, the band-like glass sheet and the band-like PET film that were cut at the same time were overlaid one on top of the other and rolled around an acrylic roll core having a diameter of 100 mm, to thereby obtain a glass sheet roll. The band-like glass sheet thus obtained was inspected in a dark room at an illuminance of 200,000 lux, and glass dust and a flaw in a back surface of the glass were not observed. Further, 50 samples each formed of a band-like glass sheet having a width of 20 mm were obtained from the glass sheet roll thus obtained to carry out evaluation by two-point bending similarly to Example 1 described above. As a result, the fracture strength was 230 MPa at the minimum and 510 MPa on average, and was at least three times as large an average as the fracture strength obtained in Comparative Example 1 described later.

In [Comparative Example 1], an alkali-free glass sheet having a long side of 460 mm, a short side of 360 mm, a thickness of 50 μm, and a thermal expansion coefficient of $38 \times 10^{-7}/°$ C. within a range of 30 to 380° C. was placed on a surface plate. Further, scribes were formed in the glass sheet at intervals of 15 mm wide, a pressing force of 2 N, and a speed of 50 mm/sec through use of a cemented carbide wheel tip having a wedge angle of 95°, and then snapping was carried out manually. In this manner, 50 samples Sa were obtained, but 10 pieces out of those 50 samples Sa had horizontal cracks propagated in every direction during the scribe formation, and thus the sampling was substantially impossible for those 10 pieces. The remaining 40 pieces were evaluated by the same method as that described above in Example 1. As a result, the fracture strength exhibited such extremely small values as 60 MPa at the minimum and 130 MPa on average.

REFERENCE SIGNS LIST 1 cutting apparatus
2 support member
2a support surface
3 localized heating means
4 cooling means
5 preset cutting line
6 cut surface
6a initial crack
8 conveyance belt (support member)
8a support surface
10 forming apparatus
11 rolling apparatus
11a roll core
E elastic sheet
G glass sheet (glass film)
Ga available portion
Gx selvage portion
H heated region
C cooled region

The invention claimed is:

1. A method of cutting a glass sheet, the method comprising cutting a full body of the glass sheet by forming an initial crack on a preset cutting line of the glass sheet that is supported by a support member from a back surface side of the glass sheet, followed by propagating the initial crack while passing through the glass sheet from a front surface to a back surface thereof due to a stress generated through localized heating along the preset cutting line and cooling of a heated region that is formed through the localized heating,
    wherein the glass sheet is supported by the support member from the back surface side through an intermediation of an elastic sheet,
    wherein the elastic sheet has lower thermal conductivity than the support member, and
    wherein the elastic sheet is interposed between the glass sheet and the support member and in contact with both the glass sheet and the support member at a position where the full body of the glass sheet is cut.

2. The method of cutting a glass sheet according to claim 1, wherein the elastic sheet comprises an organic sheet.

3. The method of cutting a glass sheet according to claim 1, wherein the elastic sheet is cut along with the cutting of the full body of the glass sheet.

4. The method of cutting a glass sheet according to claim 3, wherein the elastic sheet comprises an organic sheet.

5. The method of cutting a glass sheet according to claim 1, wherein a retaining member is arranged on a front surface side of the glass sheet so as to be opposed to the support member, the retaining member being configured to sandwich the glass sheet between the retaining member and the support member.

6. The method of cutting a glass sheet according to claim 1, wherein the glass sheet has a thickness of 200 μm or less.

7. The method of cutting a glass sheet according to claim 1, wherein the localized heating is performed through use of a carbon dioxide laser.

8. A glass sheet, which is obtained by cutting at least one side thereof by the method according to claim 1, the glass sheet having a thickness of 200 μm or less.

9. A glass sheet, which is obtained by cutting at least one side thereof by the method according to claim 1, the glass sheet having a bending strength of a cut surface of 200 MPa or more and a thickness of 200 μm or less.

10. A glass sheet, comprising an organic layer formed on at least one of a front surface, a back surface, and a cut surface thereof, the cut surface being formed by cutting the glass sheet by the method according to claim 1.

11. An apparatus for cutting a glass sheet, the apparatus having a structure in which a full body of the glass sheet is cut by forming an initial crack on a preset cutting line of the glass sheet that is supported by a support member from a back surface side of the glass sheet, followed by propagating the initial crack while passing through the glass sheet from a front surface to a back surface thereof due to a stress generated through localized heating along the preset cutting line and cooling of a heated region that is formed through the localized heating, wherein the glass sheet is supported by the support member from the back surface side through an intermediation of an elastic sheet, wherein the elastic sheet has lower thermal conductivity than the support member, and wherein the elastic sheet is interposed between the glass sheet and the support member and in contact with both the glass sheet and the support member at a position where the full body of the glass sheet is cut.

\* \* \* \* \*